US007061876B2

(12) United States Patent
Ambe

(10) Patent No.: US 7,061,876 B2
(45) Date of Patent: Jun. 13, 2006

(54) SWITCH AND BRIDGED NETWORK

(75) Inventor: Michiko Ambe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 862 days.

(21) Appl. No.: 10/061,053

(22) Filed: Jan. 29, 2002

(65) Prior Publication Data

US 2003/0053422 A1 Mar. 20, 2003

(30) Foreign Application Priority Data

Sep. 17, 2001 (JP) ............................. 2001-281084

(51) Int. Cl.
*H04L 12/28* (2006.01)

(52) U.S. Cl. ...................................... 370/256; 370/401
(58) Field of Classification Search ................ 370/401, 370/256, 408
See application file for complete search history.

(56) References Cited

U.S. PATENT DOCUMENTS 6,084,867 A * 7/2000 Meier ......................... 370/338

FOREIGN PATENT DOCUMENTS

JP 10-136003 5/1998

* cited by examiner

*Primary Examiner*—Brian Nguyen
(74) *Attorney, Agent, or Firm*—Katten Muchin Rosenmen LLP

(57) ABSTRACT

In a switch supporting a multiple spanning tree protocol and a bridged network formed of such a switch, the switch includes a default spanning tree in a multiple spanning tree, transmits, upon receipt of a frame having an individual destination address from a terminal side, an inquiry frame to a destination terminal of the individual destination address through the default spanning tree, transmits inquiry response frames to all of the spanning trees in the multiple spanning tree if the destination terminal is connected to the switch, and selects an optimum spanning tree based on information in the inquiry response frames from all of the spanning trees.

12 Claims, 9 Drawing Sheets

FIG.1A BRIDGED NETWORK EXAMPLE
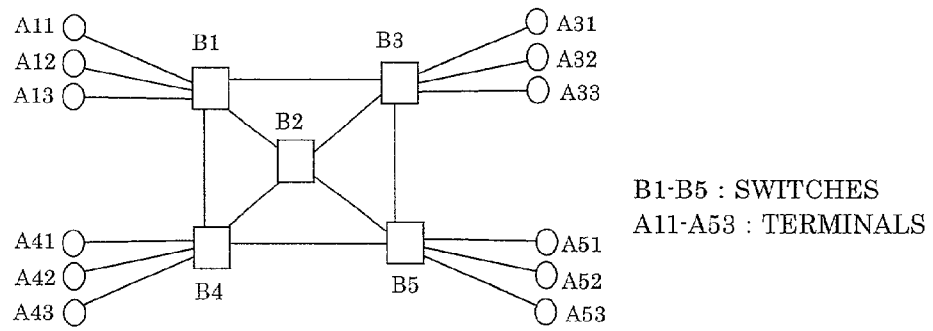
B1-B5 : SWITCHES
A11-A53 : TERMINALS
FIG.1B SPANNING TREE WITH B2 AS ROOT SWITCH
(DEFAULT SPANNING TREE EXAMPLE)
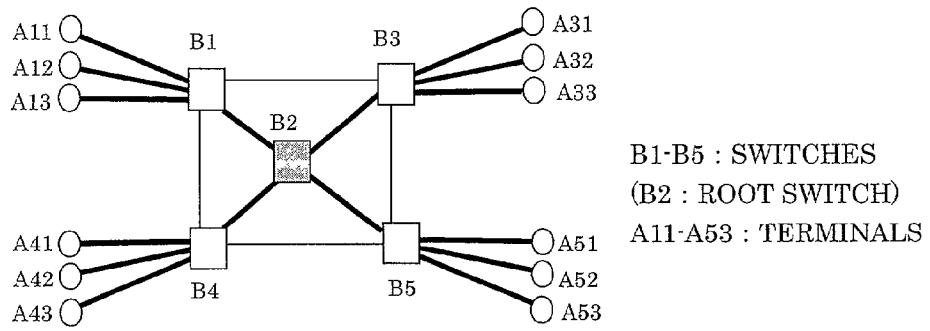
B1-B5 : SWITCHES
(B2 : ROOT SWITCH)
A11-A53 : TERMINALS
FIG.1C SPANNING TREE WITH B1 AS ROOT SWITCH
(OPTIMUM SPANNING TREE EXAMPLE)
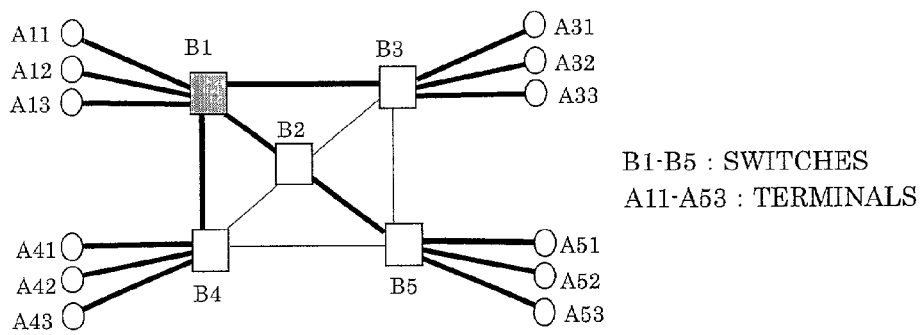
B1-B5 : SWITCHES
A11-A53 : TERMINALS B1-B5 : SWITCHES
A11-A53 : TERMINALS
b11-b36 : PORTS

FIG.4

SPANNING TREE TABLE PREPARED FOR SWITCH 1
(BY AUTOMATIC LEARNING)

| SPANNING TREE IDENTIFIER (STGI) | ROOT SWITCH ID | MAC ADDRESS OF ROOT SWITCH | OPERATION STATE | PRESENCE/ABSENCE OF DEFAULT SPANNING TREE |
|---|---|---|---|---|
| 1 | B2 | 0303030303(MAC-B2) | ACTIVE | DEFAULT |
| 2 | B1 | 0303030305(MAC-B1) | ACTIVE | NON-DEFAULT |
| 3 | B3 | 0303030612(MAC-B3) | ACTIVE | NON-DEFAULT |
| 4 | B4 | 0303030613(MAC-B4) | ACTIVE | NON-DEFAULT |
| 5 | B5 | 0303030614(MAC-B5) | ACTIVE | NON-DEFAULT |

FIG.5

PORT TABLE (EXAMPLE OF B1) 2

| PORT | EDGE /TRUNK |
|---|---|
| b11 | EDGE |
| b12 | EDGE |
| b13 | EDGE |
| b14 | TRUNK |
| b15 | TRUNK |
| b16 | TRUNK |

FIG.6

EXPANDED LEARNING TABLE (EXAMPLE OF B1) 3

| MAC ADDRESS | DESTINATION PORT | CORRESPONDING SPANNING TREE (ROOT SWITCH ID) | EDGE SWITCH | HOP COUNT | PATH COST |
|---|---|---|---|---|---|
| 010101020304 | b11 | - | MY | | |
| 010101020305 | b12 | - | MY | | |
| 010101020306 | b13 | - | MY | | |
| 010101020401 | b14 | 2 | B3 | 2 | 10 |
| 010101020402 | b15 | 1 | B5 | 3 | 3 |
| 010101020403 | b16 | 4 | B4 | 2 | 10 |
| 010101020802 | b15 | DEFAULT | UNKNOWN | ? | ? |

FIG.7

OPTIMUM SPANNING TREE SELECTION TABLE 4
(EXAMPLE OF B1 FOR A31)

| SPANNING TREE IDENTIFIER (STGI) | RESPONSE RECEPTION RESULT | RECEIVING PORT | HOP COUNT | PATH COST |
|---|---|---|---|---|
| 1 | OK | b15 | 3 | 6 |
| 2 | OK | b14 | 2 | 4 |
| 3 | OK | b14 | 2 | 4 |
| 4 | OK | b15 | 3 | 10 |
| 5 | OK | b16 | 3 | 10 |

INQUIRY FRAME (BPDU TYPE= x0"01")

(INFORMATION ELEMENT)

INQUIRY RESPONSE FRAME (BPDU TYPE= x0"02")

(INFORMATION ELEMENT)

SWITCH AND BRIDGED NETWORK

BACKGROUND OF THE INVENTION

1. Field of the Invention

The present invention relates to a switch and a bridged network, and in particular to a switch supporting a multiple spanning tree protocol and a bridged network formed of such a switch.

2. Description of the Related Art

A bridged network, as shown in FIG. 1A for example, is formed of switches B1–B5 provided with a bridge function for switching a transmission frame according to a MAC (Media Access Control) destination address, terminals A11–A13 connected to the switch B1, terminals A31–A33 connected to the switch B3, terminals A41–A43 connected to the switch B4, and terminals A51–A53 connected to the switch B5. The switches B1–B5 form loops. A switch and a terminal as well as a switch and another switch are connected with an LAN (Local Area Network).

In such a bridged network, a frame is relayed along a communication path (spanning tree) formed by a spanning tree protocol (STP) standardized by IEEE802.1D.

In an example of the bridged network in FIG. 1A, a spanning tree such as shown by thick lines in FIG. 1B is formed. Since a frame is always relayed through the switch B2 in this case, the switch B2 is called a root switch.

When such a spanning tree exists solely on a bridged network, it is called a single spanning tree (SST). In this single spanning tree, each switch has only to relay the received frame according to the sole spanning tree.

Thereafter, a VLAN (Virtual Local Area Network) technology has been utilized in the bridged network, whereby it has become possible for the switch to distinguish traffic. It is not economical that unused paths exist although the single spanning tree has redundant paths. Therefore, a multiple spanning tree protocol (MSTP) is standardized by IEEE 802.1 s for the purpose of taking advantage of a plurality of paths by forming a spanning tree per VLAN.

Namely, if all of the switches B1–B5 in the bridged network example shown in FIG. 1A support the multiple spanning tree protocol, five spanning tree protocols in total are executed including not only the spanning tree shown in FIG. 1B but also the spanning tree shown in FIG. 1C with the switch B1 as a root switch, thereby forming the spanning trees according to the respective settings of the spanning tree protocols.

The frame is relayed by using any one of the spanning trees. Which spanning tree is used for the communication is determined depending on the VLAN to which the frame belongs.

Thus, in the multiple spanning tree protocol, the VLAN to which the received frame belongs is determined, and the frame is relayed according to the spanning tree to which the VLAN is allocated. Therefore, the multiple spanning tree protocol has been used only in the VLAN environment, and has uniquely been determined by the VLAN.

As a result, there has been a problem that even if there is an optimum spanning tree (for example, a spanning tree with a smaller hop count, etc.), the said spanning tree cannot be used.

SUMMARY OF THE INVENTION

It is accordingly an object of the present invention to provide a switch supporting a multiple spanning tree protocol and a bridged network formed of such a switch which automatically selects an optimum spanning tree.

In order to achieve the above-mentioned object, a switch according to the present invention comprises: a table including a default spanning tree in a multiple spanning tree; a transceiver for transmitting, upon receipt of a frame having an individual destination address from a terminal side, an inquiry frame to a destination terminal of the individual destination address through the default spanning tree, and for transmitting inquiry response frames to all of the spanning trees in the multiple spanning tree if the destination terminal is connected to the switch; and an optimum route selecting processor for selecting an optimum spanning tree based on information in the inquiry response frame from all of the spanning trees.

In this case, the above-mentioned optimum route selecting processor may determine the optimum spanning tree by a hop count or by a path cost Also, a packet used for the spanning trees may be utilized as the inquiry frame.

Moreover, the above-mentioned optimum route selecting processor may transmit the inquiry frame and the inquiry response frame, upon receipt thereof to the default spanning tree if the destination terminal is not connected to the switch.

Moreover, the above-mentioned optimum route selecting processor may prepare a temporary spanning tree table based on the inquiry response frames received from all of the spanning trees, and may select the optimum spanning tree referring to the table.

Also, in a bridged network formed of such a switch according to the present invention, a multiple spanning tree includes a default spanning tree; the firs switch having received a frame with an individual destination address from a terminal side transmits an inquiry frame to a destination terminal at the individual address through the default spanning tree, the second switch having received the inquiry frame transmits inquiry response frames to all of the spanning trees in the multiple spanning tree if the destination terminal is connected thereto, and the first switch having received the inquiry response frames from all of the spanning trees selects an optimum spanning tree based on information in the inquiry response frame.

In this case, the above-mentioned first switch may determine the optimum spanning tree by a hop count or by a path cost.

Also, the above-mentioned first switch may utilize a packet used for the spanning trees as the inquiry frame.

Moreover, the above-mentioned switches may transmit the inquiry frame and the inquiry response frame, upon receipt thereof to the default spanning tree if the destination terminal is not connected to the switches.

Moreover, the above-mentioned first switch may prepare a temporary spanning tree table based on the inquiry response frames received from all of the spanning trees, and may select the optimum spanning tree referring to the table.

Hereinafter, operations of forming spanning trees in a switch and a bridged network according to the present invention having such arrangements, and communication over the spanning trees will be described referring to FIGS. 1A–1C.

An example of communication between the terminals A11 and A31 by an IPv4 (Internet Protocol version 4) protocol will now be described. A broadcast frame is transmitted from the terminal A11, so that the terminal A31 receives the broadcast frame through the default spanning tree shown in FIG. 1B and transmits a response frame in return.

Since the response frame at this time includes an individual address of the terminal A11, the switch B3 as the first switch, triggered in operation by the response frame, transmits an inquiry frame for selecting an optimum spanning tree to the terminal A11 that is a destination terminal through the same default spanning tree.

The switch B1 as a second switch having received the inquiry frame from the default spanning tree transmits inquiry response frames for the inquiry frame to all of the five spanning trees since the switch B1 itself is connected to the terminal A11 that is the destination terminal.

The first switch B3 having received the inquiry response frames from all of the spanning trees selects an optimum spanning tree based on information (hop count, path cost, or the like) in the inquiry response frames.

As a result, for example, the spanning tree having the switch B1 as the root switch shown in FIG. 1C is selected as the optimum spanning tree.

Meanwhile, when the terminal A11, having received the response frame to the above-mentioned broadcast frame from the terminal A31, transmits an IP data frame to the terminal A31, a similar optimum spanning tree selection is performed by the switch B1 since this frame has an individual destination address.

Namely, a similar inquiry frame is transmitted from the switch B1 that is a first switch this time through the default spanning tree.

On the contrary, inquiry response frames are transmitted from the switch B3 as a second switch through all of the spanning trees, so that the switch B1 similarly selects the optimum spanning tree based on these inquiry response frames.

Thus, an optimum spanning tree is selected in both directions between the terminals A11 and A13.

BRIEF DESCRIPTION OF THE DRAWINGS

FIGS. 1A–1C are diagrams showing arrangements of spanning trees to which the present invention is applied;

FIG. 4 is a diagram showing a spanning tree table prepared for a switch in the present invention;

FIG. 5 is a diagram showing an example of a port table used in the present invention;

FIG. 6 is a diagram showing an example of an expanded learning table used in the present invention;

FIG. 7 is a diagram showing an example of an optimum spanning tree selection table used in the present invention;

Throughout the figures, like reference numerals indicate like or corresponding components.

DESCRIPTION OF THE EMBODIMENTS

Figure 2:
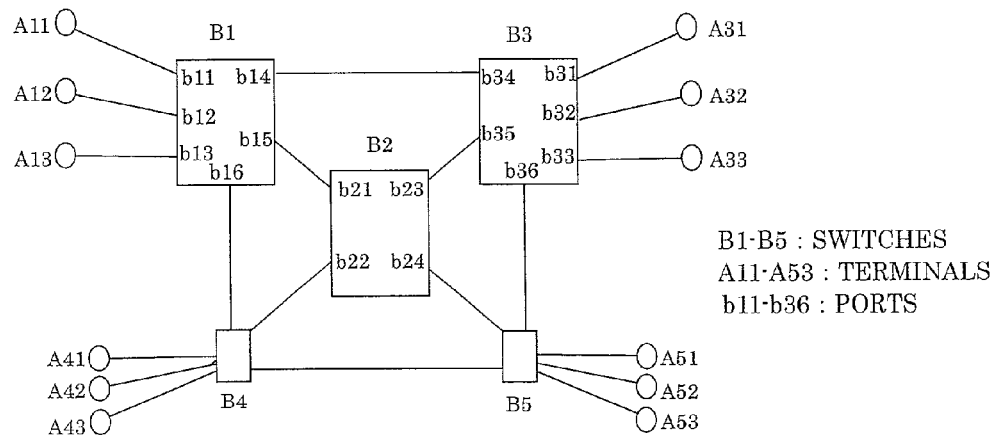
FIG. 2 is a block diagram showing an arrangement of a bridged network according to the present invention.

FIG. 2 shows the bridged network shown in FIGS. 1A–1C more specifically, where the switch B1 having ports b11–b16, the switch B2 having ports b21–b24, and the switch B3 having ports b31–b36 are especially illustrated.

In the switch B1, the ports b11–b13 form edge ports since being connected to the terminals A11–A13, and the ports b14–b16 form trunk ports since being connected to the side of the switches.

Also in the switch B2, all of the ports b21–b24 form the trunk ports since being connected to the switches. In the switch B3, the ports b31–b33 form the edge ports since being connected to the terminals A31–A33, and the ports b34–b36 form the trunk ports since being connected to the side of the switches.

Figure 3:
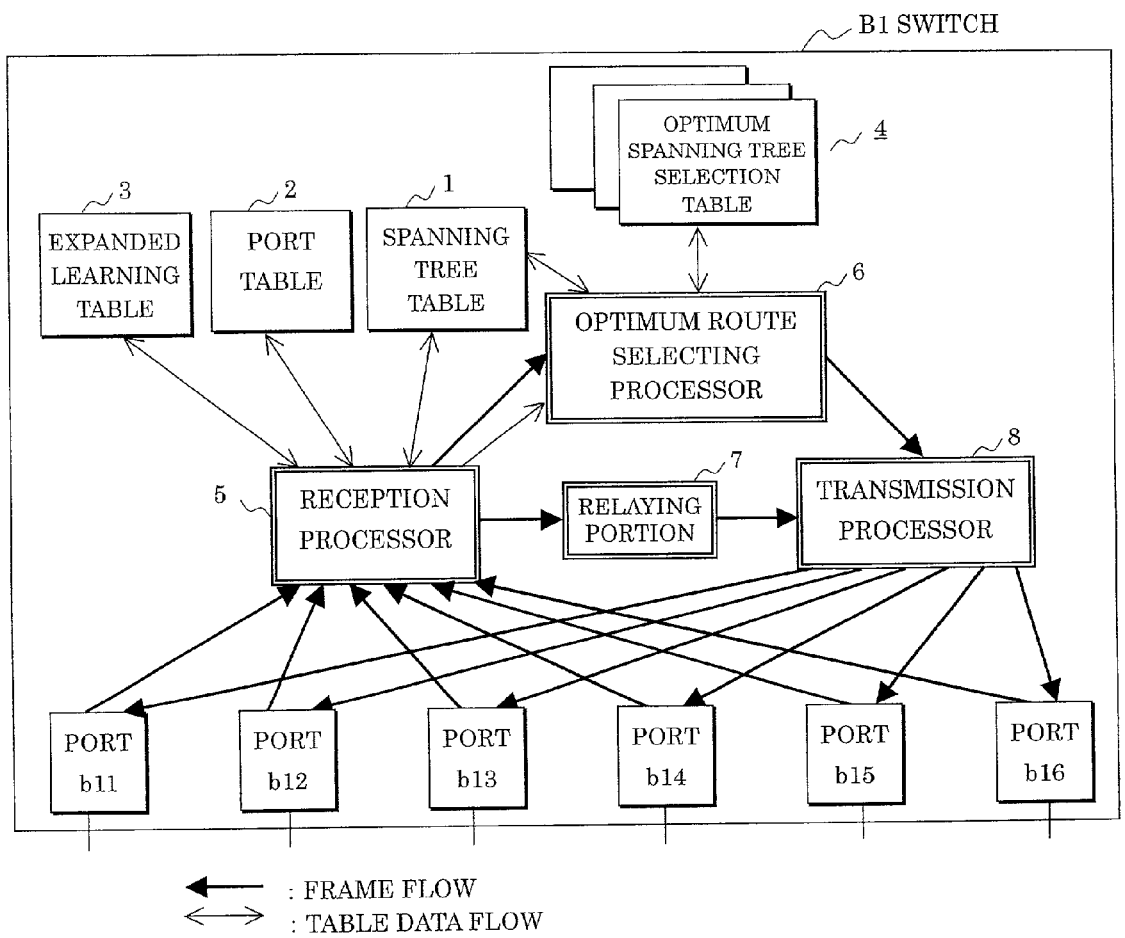
FIG. 3 is a block diagram showing an internal arrangement of a switch according to the present invention.

FIG. 3 shows an arrangement of each of the switches B1–B5 forming such a bridged network. The arrangement of the switch B1 is specifically shown for this example.

In this switch arrangement, a spanning tree table 1, a port table 2, an expanded learning table 3, and an optimum spanning tree selection table 4 are preliminarily provided. Also, the ports b11–b16 are connected to a reception processor 5, so that a reception process for the frame (thick line) is executed.

This reception processor 5 is connected to the tables 1–3 to process table data (thin line), and connected to the optimum route selecting processor 6 to transmit the frames and the table data. The optimum route selecting processor 6 is connected to the spanning tree table 1 and the optimum spanning tree selection table 4 to process the table data.

The reception processor 5 is further connected to a transmission processor 8 through a relaying portion 7 to relay the received frame. Also, the reception processor 8 is connected so as to output the frames from the optimum route selecting processor 6 from the ports b31–b36.

Embodiments of the tables 1–4 shown in FIG. 3 are respectively shown in FIGS. 4–7.

Firstly, the spanning tree table 1 shown in FIG. 4 is a table prepared for each of the switches B1–B5 shown in FIG. 2 by preliminary and automatic learning. In the example of FIG. 2, identifiers (ID) "1"–"5" are assigned to five spanning trees, and an identifier and an MAC address of a root switch for each spanning tree are prescribed. All of the operation states thereof are made "active", and which spanning tree is the default spanning tree is shown.

Also, the port table 2 in FIG. 5 shows an example of the switch B1, where the ports b11–b33 form the edge ports and the ports b14–b16 form the trunk ports as mentioned above.

As for the settings of the edge/trunk in the table 2, it is to be noted that even if "edge" has been set, it will be changed to "trunk" when a packet of the spanning tree protocol is received.

Also, the expanded learning table (learning table of 802.1D) 3 in FIG. 6 shows an example of the switch B1, and is formed of the MAC address, a destination port, a corresponding spanning tree (root switch ID), the edge switch, a hop count, and a path cost.

The upper three rows are preliminarily prepared in this table 3, and the rest are gradually increased by leaning. For example, if the MAC address of the terminal A11 has not been registered, the MAC address will be registered in the table 3.

Moreover, the optimum spanning tree selection table 4 shown in FIG. 7 is a temporary table formed temporarily for the optimum spanning tree selection. In this example, the table for the terminal A31 (switch B3) in the switch B1 is shown which is formed of a spanning tree identifier, a response reception result, a receiving port (trunk port), a hop count, and a path cost.

It is to be noted that a timer indicating an existing time of the table 4 is started when the inquiry frame is transmitted, so that the table 4 exists until all of the inquiry response frames are received or until the timeout of the timer.

Also, the switches are required to have a default setting of the path cost and/or the hop count as a selection standard of the optimum spanning tree.

Also, as an operation when the response frame to the inquiry is not returned, a default registration is not made or the default spanning tree is registered.

Moreover, when the port of each switch can not determine whether it is the edge or the trunk, there is a possibility that an optimum spanning tree selection is repeated a number of times for a certain destination MAC address. In such a case, a default spanning tree may be registered. In this case, however, if the optimum spanning tree selection is performed for the destination MAC address when the edge port has not yet learned the destination MAC address, the default spanning tree protocol is to be selected as the optimum one.

Figure 8:
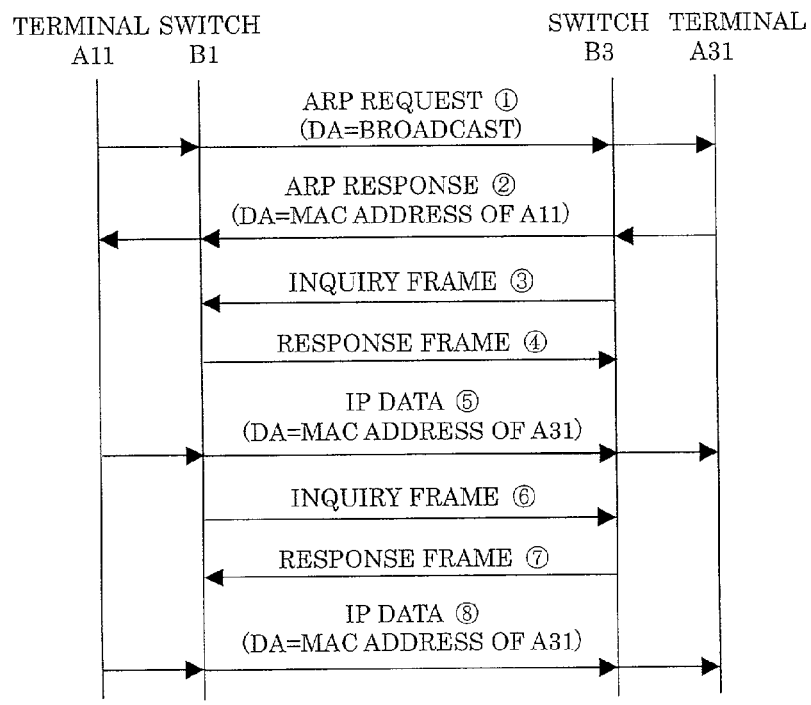
FIG. 8 is a sequence chart showing an optimum spanning tree selection procedure in a bridged network according to the present invention.
Figure 10:
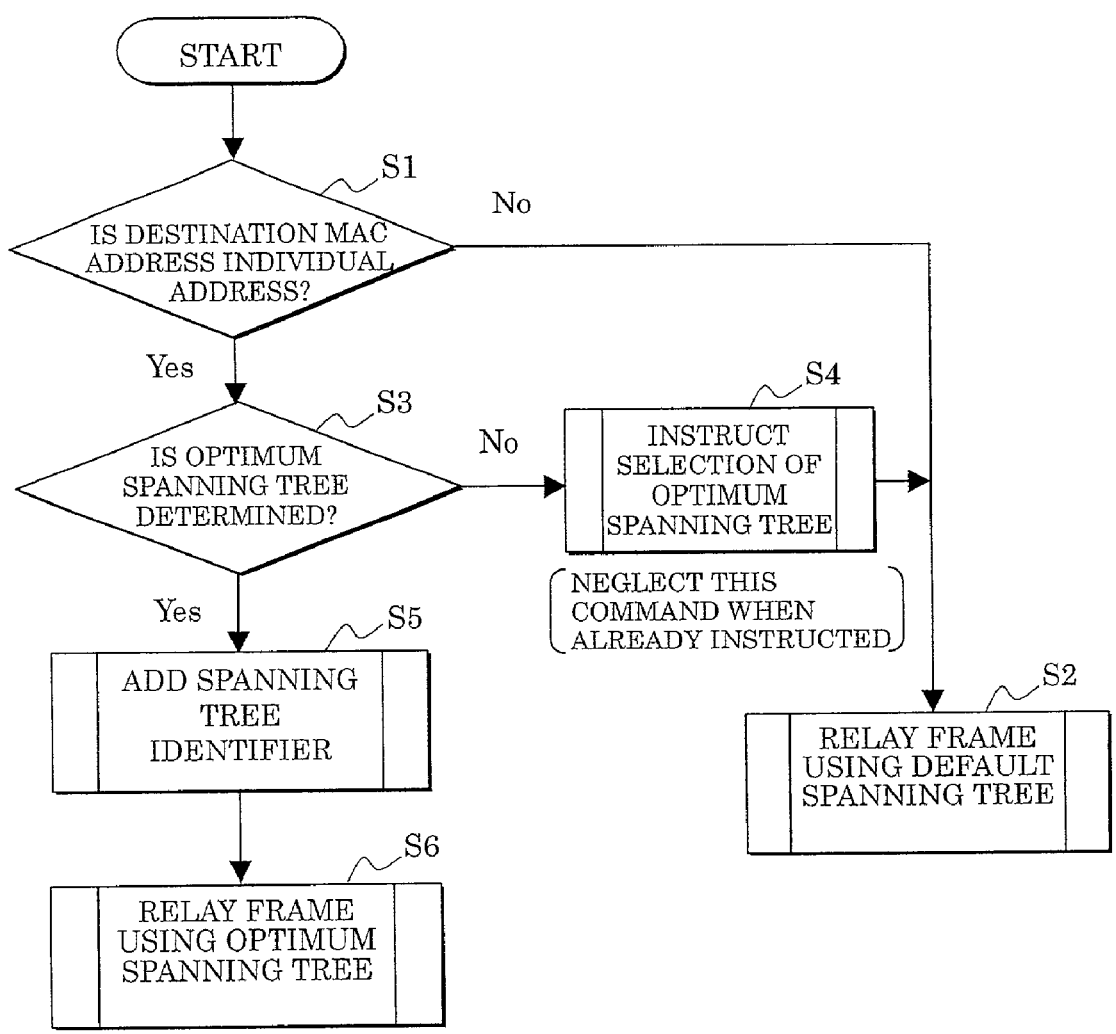
FIG. 10 is a flow chart showing an operation example when a frame is received at an edge port in a switch according to the present invention.
Figure 11:
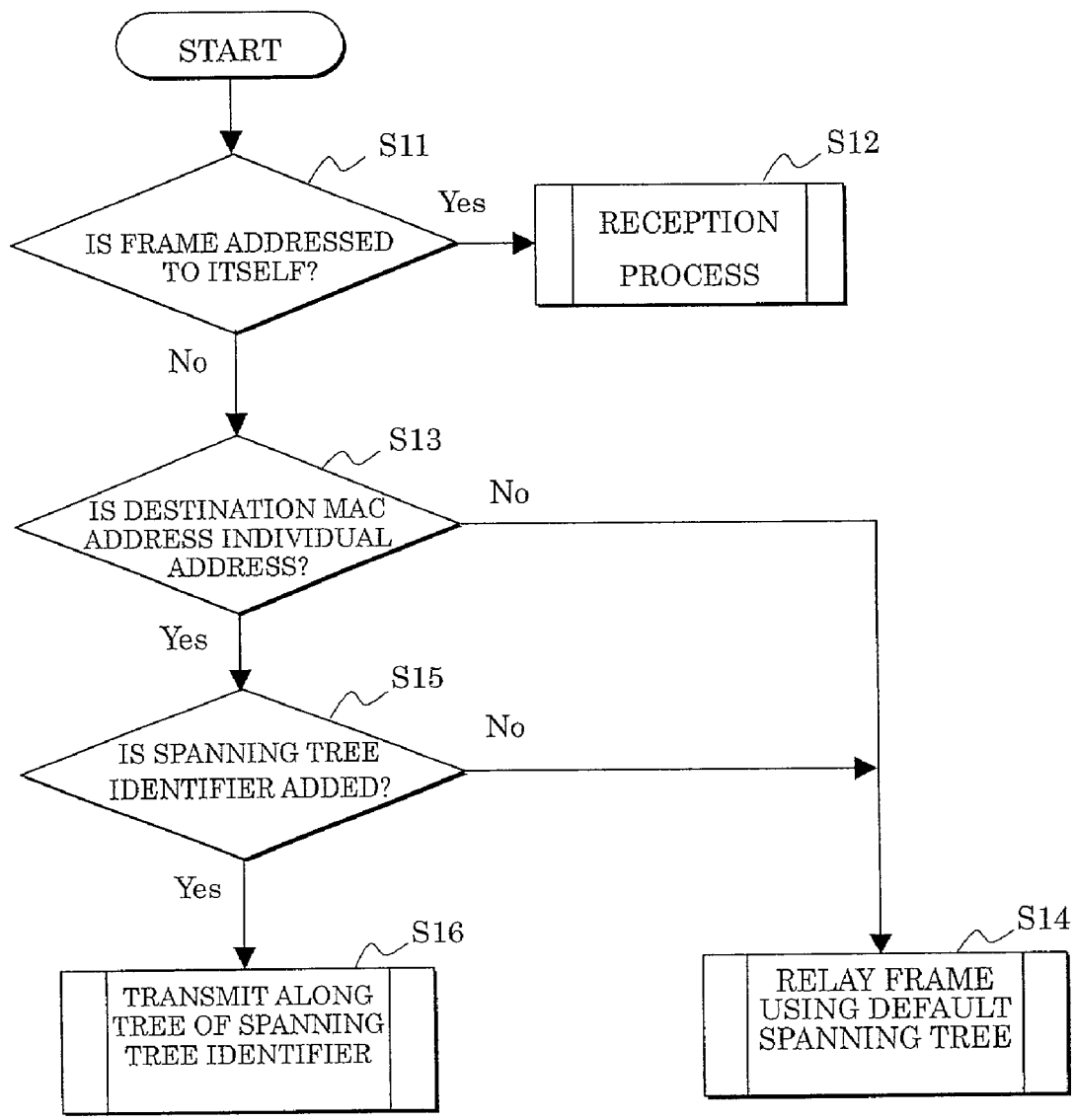
FIG. 11 is a flow chart showing an operation example when a frame is received at a trunk port in a switch according to the present invention.
Figure 12:
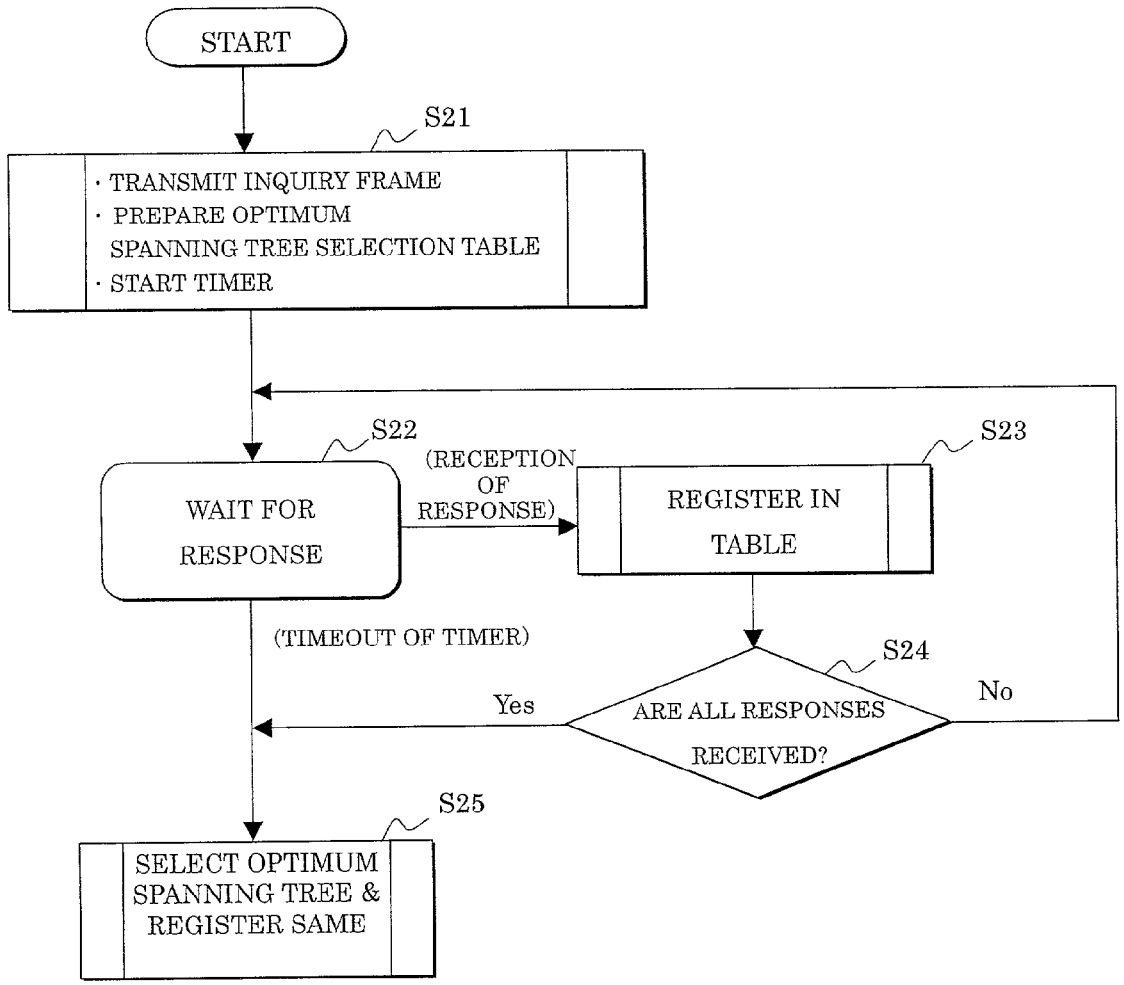
FIG. 12 is a flow chart when an optimum spanning tree is selected according to the present invention.
Figure 13:
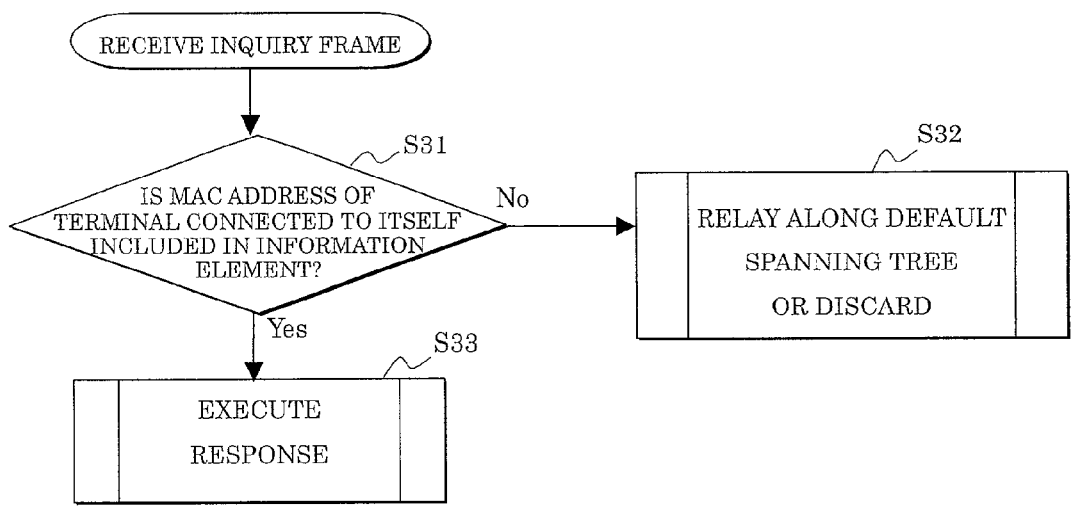
FIG. 13 is a flow chart showing a reception process of an inquiry frame in a switch according to the present invention.
Figure 14:
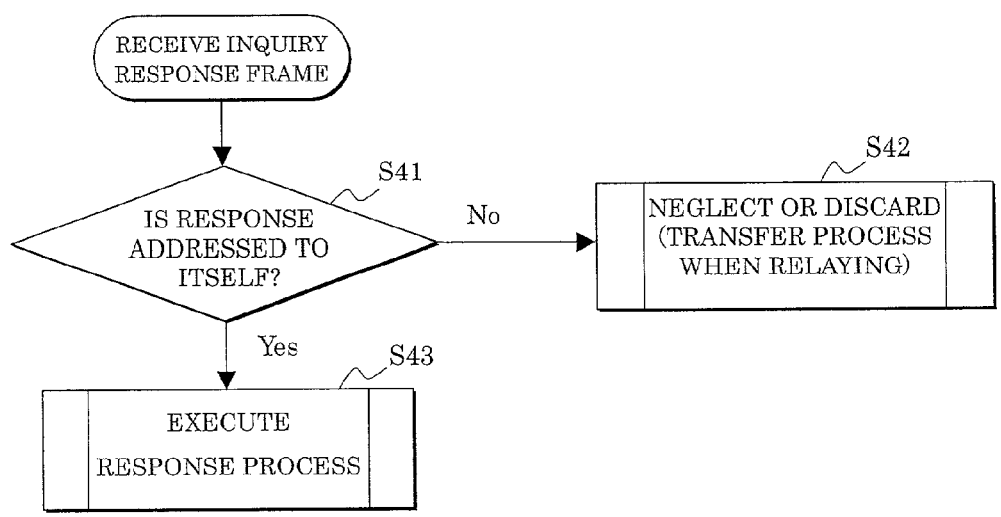
FIG. 14 is a flow chart showing a reception process of an inquiry response frame in a switch according to the present invention.

Hereinafter, the operation embodiment of the optimum spanning tree selection by the present invention having the above-mentioned arrangement will be described in order referring to sequences ①–⑧ of FIG. 8, as well as FIGS. 9A, 9B, and 10–14. It is to be noted that while in this operation embodiment, the optimum spanning tree selection where a communication by the IPv4 protocol is performed between the terminals A11 and A33 shown in FIG. 2 is taken as an example, this invention is not limited to this embodiment. Also, the flow charts of FIGS. 10–14 are executed by the switches, in which FIGS. 10 and 11 are executed by the reception processor 5, and FIGS. 12–14 are executed by the optimum route selecting processor 6.

① Transmission of ARP (Address Resolution Protocol) Request Frame from Terminal A11 to Terminal A31:

The terminal A11 transmits a frame whose destination MAC address is a broadcast address to the switch B1. Having received the frame at the edge port b11, the reception processor 5 of the switch B1 learns that the destination MAC address is not an individual address based on the flow chart of FIG. 10 (at step S1).

Then, since the reception processor 5 finds that the spanning tree of the identifier "1" with the switch B2 as the root switch is the default spanning tree referring to the spanning tree table 1 shown in FIG. 4, it transfers an ARP request frame along the default spanning tree (at step S2).

Namely, the reception processor 5 refers to the expanded learning table 3 shown in FIG. 6, and transmits the ARP request frame along the default spanning tree from the port b15 if the MAC address of the terminal A11 is registered in the learning table 3 and the edge bridge="UNKNOWN". At this time, the frame is transmitted from the reception processor 5, through the relaying portion 7, to the transmission processor 8.

Therefore, the ARP request frame is relayed by the switches B1, B2, and B3. However, since the ARP request frame is actually a broadcast frame, it is also relayed from the switch B2 to the switches B4 and B5.

When the ARP request frame is relayed through the default spanning tree, the switch B2 receives the ARP request frame at the trunk port b21. According to the flow chart of FIG. 11, the ARP request frame is not a frame addressed to the switch B2 itself (at step S11), and the destination MAC address is not the individual address since it is the broadcast (at step S13). Therefore, the frame is relayed using the default spanning tree (at step S14), and the ARP request frame is transmitted from the port b23 to the trunk port b35 of the switch B3.

Then, the reception processor 5 of the switch B3 finds that the frame is addressed to the switch B3 itself this time also by the flow chart of FIG. 11 (at step S11), and executes the reception process of the ARP request frame (at step S12).

It is to be noted that the same process as that of the switch B2 is also executed by the switches B4 and B5.

② Transmission of ARP Response Frame from Terminal A31 to Terminal A11:

The terminal A31 having received the ARP request frame from the edge port b31 of the switch B3 transmits an ARP response frame whose destination MAC address is the terminal A11. In the switch B3, the ARP response frame is received at the edge port b31. By the flow chart of FIG. 10, the switch B3 finds that the destination MAC address is an individual address (at step S1), and relays the ARP response frame using the default spanning tree (at step S2).

Namely, since the switch B3 has learned the MAC address of the terminal A11 but has not yet selected an optimum spanning tree, the switch B3 transmits the ARP response frame along the default spanning tree. The relaying operation of the ARP response frame in this case is executed according to the flow chart of FIG. 11 as in the case of the above-mentioned ARP request frame.

③ Transmission of Inquiry Frame from Switch B3 to Switch B1:

The switch B3 triggered in operation by the receipt of the ARP response frame from the terminal A31 starts the process for selecting the optimum spanning tree. Namely, as shown in FIG. 10, when the ARP response frame having the destination MAC address of the individual address is received (at step S1), an optimum spanning tree has not yet been determined (at step S3). Therefore, the selection of the optimum spanning tree is executed (at step S4), and the frame is transmitted to the default spanning tree (at step S2).

Hereinafter, the selection operation of the optimum spanning tree between the terminals A31 and A11 will be described.

The terminal A11 is registered in the expanded learning table 3 shown in FIG. 6 and the edge switch is "UNKNOWN" in the switch B3, so that the switch B3 transmits the ARP response frame along the default spanning tree as mentioned above.

Hereafter, the switch B3 checks whether or not a corresponding spanning tree is executed. If it is not executed, an inquiry frame including the terminal A11 as the destination MAC address is transmitted by the optimum route selecting processor 6 from the trunk port b35 through the default spanning tree (at step S21 of FIG. 12).

The MAC address of the edge switch in the inquiry frame at this time is addressed to all of the switches, and the MAC address of the terminal A11 is inserted into the frame information element as mentioned above. The inquiry frame is relayed from the switch B2 to the switches B1, B4, and B5 through the default spanning tree.

As the above-mentioned inquiry frame, a frame having a BPDU (Bridge Protocol Data Unit) expanded in use for the spanning tree can be used.

Figure 9A:
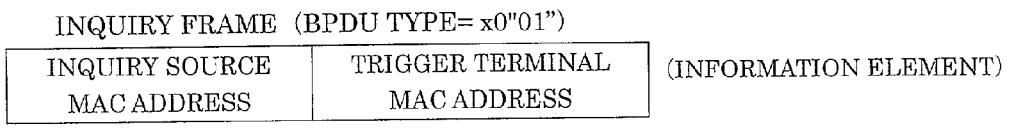
FIGS. 9A and 9B are diagrams respectively showing an inquiry frame and an inquiry response frame used in the present invention.

Namely, an inquiry frame is indicated by the BPDU type=x0"01" as shown in FIG. 9A, so that the MAC address of the inquiring switch B3 is stored in an inquiry source MAC address forming information element, and the MAC address of the terminal A11 which has triggered the inquiry is stored in a trigger terminal MAC address also forming the information element.

Each of the switches having received this inquiry frame looks into the trigger terminal MAC address of the information element to check whether or not the terminal having the trigger terminal MAC address is connected to the edge port of the switch itself (at step S31 of FIG. 13).

As a result, no response is returned when the terminal is not connected to the edge port (such as in the switches B2, B4, and B5 in this example), and the inquiry frame is relayed along the default spanning tree or discarded (at step S32). On the contrary, a response is returned (at step S33) when the terminal is connected to the edge port (such as in the switch B1 in this example).

Figure 9B:
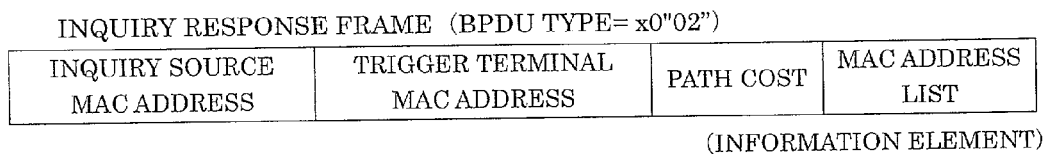

④ Transmission of Inquiry Response Frame from Switch B1 to Switch B3:

FIG. 9B shows a format of an inquiry response frame, which is applied to the case where the BPDU type=x0"02". The inquiry source MAC address and the trigger terminal MAC address of the inquiry frame shown in FIG. 9A are stored unchanged.

As for the path cost, the source switch of the inquiry response frame (switch B1 in this case) sets the value of its own, the relaying switch (switch B2 in this case) adds the path cost of its own to the path cost value included therein to set the value. It is to be noted that the value of the path cost is held per spanning tree. As for an MAC address list, the addresses of the frame transmitting switch (B1) and the relaying switch (B2) are added in this order.

The transmission of an inquiry response frame by the switch B1 is performed to all of the spanning trees. In this case, a spanning tree identifier is included in the inquiry response frame. At this time, its path cost and its MAC address are inserted into the inquiry response frame.

The switch having received the inquiry response frame checks the inquiry source MAC address of the frame information element by the flow chart of FIG. 14 to determine whether or not the MAC address corresponds to the switch itself (at step S41).

As a result, when the inquiry source MAC address of the frame information element does not correspond to the switch itself and it is found that the inquiry response frame is not addressed to itself, the inquiry source switch B3 neglects or discards the frame, while the relaying switches B2, B4, and B5 execute the relaying process (at step S42). Namely, in the latter, its own path cost is added to the path cost of the information element of the inquiry response frame, and its own MAC address is added at the end of the frame.

On the other hand, when it is found that the inquiry response frame is addressed to the switch itself (switch B3 in the example of FIG. 2), the response process is executed (at step S43). Namely, the information element (path cost, etc.) is taken out from the inquiry response frame to be registered in the optimum spanning tree table 4 (see FIG. 7) (at step S21 of FIG. 12).

When the information from all of the spanning trees is registered (at steps S22–S24), the optimum route selecting processor 6 selects the optimum spanning tree, and registers the result in the spanning tree table 1 (see FIG. 4) (at step S25). If the information is still insufficient before the timeout of the timer, the other response frames are waited for (at step S22).

The optimum spanning tree selection can be determined by the path cost of the spanning tree and/or the hop count used for the relaying. When a timeout occurs at the timer of the optimum spanning tree selection table 4, the spanning tree is selected from among the information currently registered.

When no response is returned, the table is simply deleted without anything else being done. As an option, the default spanning tree may be registered.

After the optimum spanning tree is selected in this way, a frame addressed to the terminal A11 is relayed using the spanning tree (at steps S3, S5, and S6 of FIG. 10).

Namely, since the terminal A11 is registered in the table 3, the edge switch≠"MY", and the edge switch≠"UNKNOWN", the corresponding spanning tree has been determined. Therefore, the route identifier corresponding to the spanning tree is added to the frame to be transmitted to the corresponding port.

⑤ Transmission of IP Data from Terminal A11 to Terminal A31:

By the above ②, the ARP response frame is transmitted from the terminal A31 to the terminal A11. This time, frame data with the destination MAC address=A31 is transmitted from the terminal A11, and the switch B11 having received this frame data transmits the frame along the default spanning tree in the same way as the ARP response frame of the above-mentioned ②.

⑥ Transmission of Inquiry Frame from Switch B1 to Switch B3:

The switch B1, triggered in operation by the reception of the data frame from the terminal A11, transmits the same inquiry frame as the inquiry frame of the above-mentioned ③ to the switch B3.

⑦ Transmission of Inquiry Response Frame from Switch B3 to Switch B1:

The switch B3 transmits inquiry response frames in the same way as the inquiry response frame of the above-mentioned ④ to the switch B1 through all of the spanning trees in response to the inquiry frame of the above-mentioned ⑥, and the switch B1 executes the optimum spanning tree selection in the same way as that executed in the switch B3.

⑧ Transmission of IP Data from Terminal A11 to Terminal A31:

Since the optimum spanning tree has been already selected, the switch B1 having received the IP data from the terminal A11 adds the identifier of the optimum spanning tree to the frame according to the flow chart of FIG. 10 (at step S5), and relays the frame using the optimum spanning tree (at step S6) in the same way as the IP data transmission of the above ⑤.

The equipment relaying this frame refers to the destination MAC address of this frame and the spanning tree identifier added to the frame, and relays the frame along the appropriate spanning tree.

As described above, a switch and a bridged network according to the present invention are arranged such that the switch includes a default spanning tree in a multiple spanning tree, transmits, upon receipt of a frame having an individual destination address from a terminal side, an inquiry frame to a destination terminal of the individual destination address through the default spanning tree, transmits inquiry response frames to all of the spanning trees in the multiple spanning tree if the destination terminal is connected to the switch, and selects an optimum spanning tree based on information in the inquiry response frames from all of the spanning trees. Therefore, it is made possible to automatically select the optimum spanning tree in case of a network configuration change. Moreover, since the switches automatically select the optimum spanning tree, manual management is not required.

Also, the switch and the bridged network according to the present invention can improve the network usage efficiency, and enable the communication without using a redundant path, thereby suppressing the traffic flowing on a specific transmission line to minimum.

I claim:

1. A switch supporting a multiple spanning tree protocol comprising:
    a table including a default spanning tree in a multiple spanning tree;
    a transceiver for transmitting, upon receipt of a frame having an individual destination address from a terminal side, an inquiry frame to a destination terminal of the individual destination address through the default spanning tree, and for transmitting inquiry response frames to all of the spanning trees in the multiple spanning tree if the destination terminal is connected to the switch; and
    an optimum route selecting processor for selecting an optimum spanning tree based on information in the inquiry response frames from all of the spanning trees.

2. The switch as claimed in claim 1 wherein the optimum route selecting processor determines the optimum spanning tree by a hop count.

3. The switch as claimed in claim 1 wherein the optimum route selecting processor determines the optimum spanning tree by a path cost.

4. The switch as claimed in claim 1 wherein a packet used for the spanning trees is utilized as the inquiry frame.

5. The switch as claimed in claim 1 wherein the optimum route selecting processor transmits the inquiry frame and the inquiry response frame, upon receipt thereof to the default spanning tree if the destination terminal is not connected to the switch.

6. The switch as claimed in claim 1 wherein the optimum route selecting processor prepares a temporary spanning tree table based on the inquiry response frames received from all of the spanning trees, and selects the optimum spanning tree referring to the table.

7. A bridged network comprising:
    a plurality of switches respectively supporting a multiple spanning tree protocol for a multiple spanning tree including a default spanning tree;
    the switches including a first and a second switch,
    the first switch having received a frame with an individual destination address from a terminal side transmitting an inquiry frame to a destination terminal at the individual address through the default spanning tree,
    the second switch having received the inquiry frame transmitting inquiry response frames to all of the spanning trees in the multiple spanning tree if the destination terminal is connected thereto, and
    the first switch having received the inquiry response frames from all of the spanning trees selecting an optimum spanning tree based on information in the inquiry response frame.

8. The bridged network as claimed in claim 7 wherein the first switch determines the optimum spanning tree by a hop count.

9. The bridged network as claimed in claim 7 wherein the first switch determines the optimum spanning tree by a path cost.

10. The bridged network as claimed in claim 7 wherein the first switch utilizes a packet used for the spanning trees as the inquiry frame.

11. The bridged network as claimed in claim 7 wherein the switches transmit the inquiry frame and the inquiry response frame, upon receipt thereof to the default spanning tree if the destination terminal is not connected to the switches.

12. The bridged network as claimed in claim 7 wherein the first switch prepares a temporary spanning tree table based on the inquiry response frames received from all of the spanning trees, and selects the optimum spanning tree referring to the table.

* * * * *